United States Patent
Ludwigsen

(10) Patent No.: US 8,077,179 B2
(45) Date of Patent: Dec. 13, 2011

(54) SYSTEM AND METHOD FOR CREATING ANIMATED VIDEO WITH PERSONALIZED ELEMENTS

(75) Inventor: David M. Ludwigsen, New York, NY (US)

(73) Assignee: Pandoodle Corp., Mountain View, CA (US)

( * ) Notice: Subject to any disclaimer, the term of this patent is extended or adjusted under 35 U.S.C. 154(b) by 24 days.

(21) Appl. No.: 11/456,771

(22) Filed: Jul. 11, 2006

(65) Prior Publication Data

US 2007/0008322 A1 Jan. 11, 2007

Related U.S. Application Data

(60) Provisional application No. 60/698,177, filed on Jul. 11, 2005.

(51) Int. Cl.
*G06T 13/00* (2011.01)

(52) U.S. Cl. ........................................ 345/473; 345/474

(58) Field of Classification Search ........................ None
See application file for complete search history.

(56) References Cited

U.S. PATENT DOCUMENTS

| | | |
|---|---|---|
| 4,430,064 A | 2/1984 | Lamarche |
| 4,521,014 A | 6/1985 | Sitrick |
| 4,569,026 A | 2/1986 | Best |
| 4,710,873 A | 12/1987 | Breslow et al. |
| 5,099,337 A | 3/1992 | Cury |
| 5,109,482 A | 4/1992 | Bohrman |
| 5,119,442 A | 6/1992 | Brown |
| 5,502,807 A | 3/1996 | Beachy |
| 5,595,389 A | 1/1997 | Parulski et al. |
| 5,634,849 A | 6/1997 | Abecassis |
| 5,687,331 A | 11/1997 | Volk et al. |
| 5,703,995 A | 12/1997 | Willbanks |
| 5,805,784 A | 9/1998 | Crawford |
| 5,960,099 A | 9/1999 | Hayes, Jr. et al. |
| 6,011,562 A | 1/2000 | Gagné et al. |
| 6,061,532 A * | 5/2000 | Bell .............................. 396/661 |
| 6,072,537 A | 6/2000 | Gurner et al. |
| 6,072,933 A | 6/2000 | Green |
| 6,086,380 A | 7/2000 | Chu et al. |
| 6,154,600 A | 11/2000 | Newman et al. |

(Continued)

FOREIGN PATENT DOCUMENTS

WO 9635998 A1 11/1996

OTHER PUBLICATIONS

Chen, H., Zheng, N., Liang, L., Li, Y., Xu, Y., and Shum, H. 2002. PicToon: a personalized image-based cartoon system. In Proceedings of the Tenth ACM international Conference on Multimedia (Juan-les-Pins, France, Dec. 1-6, 2002). Multimedia '02. ACM, New York, NY, 171-178.*

(Continued)

*Primary Examiner* — Daniel Hajnik
(74) *Attorney, Agent, or Firm* — Patent Law Group LLP; Carmen C. Cook

(57) ABSTRACT

Described herein are systems and methods for cartoonizing an image and incorporating the image into an animated video based upon a predefined animated story. In alternate embodiments of the invention, multiple images may be incorporated into the animated video. In further embodiments, the animated video may be output from the system in printed, hard copy.

17 Claims, 2 Drawing Sheets

U.S. PATENT DOCUMENTS

| | | | |
|---|---|---|---|
| 6,226,015 B1 * | 5/2001 | Danneels et al. | 345/473 |
| 6,285,381 B1 | 9/2001 | Sawano et al. | |
| 6,297,830 B1 | 10/2001 | Hoddie et al. | |
| 6,425,825 B1 | 7/2002 | Sitrick | |
| 6,463,205 B1 * | 10/2002 | Aschbrenner et al. | 386/52 |
| 6,466,213 B2 | 10/2002 | Bickmore et al. | |
| 6,504,546 B1 | 1/2003 | Cosatto et al. | |
| 6,512,521 B1 | 1/2003 | Era | |
| 6,606,096 B2 | 8/2003 | Wang | |
| 6,664,956 B1 | 12/2003 | Erdem | |
| 6,677,967 B2 | 1/2004 | Sawano et al. | |
| 6,714,202 B2 | 3/2004 | Dorrell | |
| 6,731,287 B1 | 5/2004 | Erdem | |
| 6,894,686 B2 | 5/2005 | Stamper et al. | |
| 7,039,219 B2 | 5/2006 | Liu et al. | |
| 7,098,920 B2 * | 8/2006 | Marschner et al. | 345/473 |
| 7,109,993 B2 | 9/2006 | Peleg et al. | |
| 7,137,892 B2 | 11/2006 | Sitrick | |
| 7,184,048 B2 | 2/2007 | Hunter | |
| 7,257,310 B2 | 8/2007 | Hossain | |
| 7,388,586 B2 * | 6/2008 | Yeung et al. | 345/473 |
| 7,424,545 B2 | 9/2008 | Ducheneaut et al. | |
| RE40,688 E | 3/2009 | Green | |
| 2002/0067362 A1 | 6/2002 | Agostino Nocera et al. | |
| 2002/0107895 A1 | 8/2002 | Timmer | |
| 2002/0118198 A1 | 8/2002 | Hunter | |
| 2003/0001846 A1 | 1/2003 | Davis et al. | |
| 2003/0025726 A1 | 2/2003 | Yamamoto | |
| 2003/0066090 A1 | 4/2003 | Traw et al. | |
| 2003/0069732 A1 * | 4/2003 | Stephany et al. | 704/270 |
| 2003/0193503 A1 | 10/2003 | Seminatore et al. | |
| 2003/0227473 A1 | 12/2003 | Shih et al. | |
| 2003/0228135 A1 | 12/2003 | Illsley | |
| 2004/0012613 A1 | 1/2004 | Rast | |
| 2004/0136695 A1 | 7/2004 | Kuroiwa | |
| 2004/0264939 A1 | 12/2004 | Hua et al. | |
| 2005/0057570 A1 | 3/2005 | Cosatto et al. | |
| 2005/0062743 A1 | 3/2005 | Marschner et al. | |
| 2005/0069225 A1 | 3/2005 | Schneider et al. | |
| 2005/0257242 A1 | 11/2005 | Montgomery et al. | |
| 2006/0007243 A1 | 1/2006 | Miller | |
| 2006/0028951 A1 | 2/2006 | Tozun et al. | |
| 2006/0112344 A1 | 5/2006 | Ducheneaut et al. | |
| 2006/0126925 A1 | 6/2006 | Vesely et al. | |
| 2006/0174264 A1 | 8/2006 | Candelore | |
| 2006/0200745 A1 | 9/2006 | Furmanski et al. | |
| 2007/0028264 A1 | 2/2007 | Lowe et al. | |
| 2007/0203845 A1 | 8/2007 | Gross et al. | |

OTHER PUBLICATIONS

Harmony™ animation software package (available from Toon Boom Animation, Inc., Montreal, Canada).
Opus™ animation software package (available from Toon Boom Animation, Inc., Montreal, Canada).
KToon™ 2D animation toolkit (available from Toonka Films).
Flash MX™ software (available from Macromedia, Inc., San Francisco, CA).
Massive Live™ software (available from Massive Software, Auckland, New Zealand).
Adobe Photoshop® software (available from Adobe Systems, Inc., San Jose, CA).
Coreldraw® graphics software (available from Corel Corporation, Ottawa, Canada).
Comic Life software (available in multiple versions from Apple Computer, Inc., Cupertino, CA).
Microsoft Paint™ (available from Microsoft Corporation, Redmond, WA).
Mirage™ software (available from Bauhaus Software, Inc., San Antonio, TX).
Maya® animation software (available from Alias Systems Corp., Toronto, Canada).
Animo™ software package (available from Cambridge Animation Systems, Cambridge, England).

* cited by examiner

FIGURE 2

201
Photograph or other 2D depiction of a subject is provided

202
User selects portion of subject for cartoonizing

203
Image or portion thereof is cartoonized

204
User selects predetermined animated story into which cartoonized image is incorporated

205
User selects additional features for animated video

206
Animated video and/or printed version of animated video with cartoonized elements is output

SYSTEM AND METHOD FOR CREATING ANIMATED VIDEO WITH PERSONALIZED ELEMENTS

CROSS-REFERENCE TO RELATED APPLICATIONS

The present application claims the benefit of provisional application 60/698,177, filed Jul. 11, 2005, which is incorporated herein by reference in its entirety.

FIELD OF INVENTION

The invention relates to the creation of animated videos, and in particular embodiments, to animated videos that include personalized or "cartoonized" elements.

BACKGROUND OF THE INVENTION

Advances in computer technology have enabled amateur cartoonists and even children to produce animated videos or cartoons of exceptionally high quality. A wide array of products is commercially available to be used for this purpose, with applications in both the home entertainment and professional sectors. By way of example, Harmony™ and Opus™ 2D animation software packages (both available from Toon Boom Animation, Inc.; Montreal, Canada), KToon™ 2D animation toolkit (an open source product available from Toonka Films), and Flash MX™ 2004 (available from Macromedia, Inc.; San Francisco, Calif.) provide for the creation of digital animation with a great number of features. Similarly, the Massive Live™ 3D animation system (available from Massive Software; Auckland, New Zealand) allows a user to generate crowd-related visual effects for film and television in which characters can be designed with a set of reactions to events taking place around them. Digital photographs or other images can be readily imported into animation schemes created with the aforementioned products. Such photographs can be edited with one or more of a vast array of tools to enhance, distort or otherwise manipulate the image. Technology in this field continues to develop at a rapid pace; continually bringing new products to market that provide end users with tools to create animated videos and cartoons with ever-increasing ease.

In a related area, a number of video games include animation-related features that rely on user input of graphical content for entertainment purposes. By way of example, U.S. Pat. No. 4,710,873 describes an early-generation video arcade game that incorporates a photographic image of a player at predetermined points in the game. U.S. Pat. No. 6,677,967 describes a more contemporary video game system that incorporates a variation on this idea. Similarly, U.S. Pat. No. 5,595,389 describes a technique for creating personalized video games in which, for example, a digital photograph of the user's face is superimposed on the face of a character in the game.

There remains a need in the art for additional products that enable one to integrate photographic content, such as the digital image of one's face, with animation technology to produce personalized animated videos or cartoons for both professional and entertainment purposes.

The foregoing examples of the related art and limitations related therewith are intended to be illustrative and not exclusive. Other limitations of the related art will become apparent to those of skill in the art upon a reading of the specification and a study of the drawings. All references cited herein are incorporated by reference as if fully set forth.

SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one embodiment, the invention includes a system for cartoonizing an image and incorporating said image into an animated video, comprising a cartoonizing application to cartoonize said image and create a cartoonized output, and an animation application to incorporate said cartoonized output into an animated video based on an animated story selected from a database of predefined animated stories. The image may be obtained from a photograph or other two-dimensional depiction of a subject. The cartoonizing application may include at least one graphics editing option, which may be further selected from an option to select a portion of the photograph or other two-dimensional depiction of a subject to be cartoonized, an option to adjust the size of the image, and combinations thereof. The system may be configured to display the cartoonized output as a preview prior to the animation application incorporating the cartoonized output into the animated video. The animation application may further include the database of predefined animated stories. Each predefined animated story in the database of predefined animated stories may further comprise a series of templates with positions assigned on each template for insertion of the cartoonized output on those of said templates in which the cartoonized output is predetermined to appear. Each template may be assigned at least one feature to further modify or select a version of said cartoonized output. The version of the cartoonized output may be selected from facial position type, palette of skin tone, and combinations thereof. The animation application may be configured to receive at least one user input selected from a selection of a predefined animated story from the database of predefined animated stories, a selection of a character parameter, a selection of a format of a system output, and combinations thereof. The system may be configured to produce a system output comprising an animated video. The system may be configured to store the system output on an electronic medium, to transmit the system output through an electronic communications network, or both. The system may be configured to produce a system output comprising a printed version of some or all of said animated video. The cartoonizing application may be configured to cartoonize an image for each of a number of subjects and create a cartoonized output for each such cartoonized image, and the animation application may be configured to incorporate each of the cartoonized outputs into the animated video based on the animated story selected from the database of predefined animated stories. Each predefined animated story in the database of predefined animated stories may further comprise a series of templates with positions assigned on each template for insertion of one or more of the cartoonized outputs on those of the templates in which one or more of the cartoonized outputs is predetermined to appear.

In another embodiment, the invention includes a method for cartoonizing an image and incorporating the image into an animated video, comprising: providing a system comprising a cartoonizing application to cartoonize the image and create a cartoonized output, an animation application to incorporate the cartoonized output into an animated video based on an animated story selected from a database of predefined animated stories, and the database of predefined animated stories; providing a photograph or other two-dimensional depiction of a subject; selecting a portion of the subject from the photograph or other two-dimensional depiction of the subject; cartoonizing the portion of the subject to create the cartoonized output; selecting an animated story from the database of predefined animated stories; incorporating the cartoonized output into the animated story; and outputting the animated video comprising the cartoonized output incorporated into the animated story. The method may further include selecting one or more additional features for the animated video. The method may further include displaying the cartoonized output as a preview prior to incorporating it into the animated story. The method may further include outputting the animated video in a format selected from a video format, a print format, and combinations thereof.

In another embodiment, the invention includes a computer-readable medium having computer-executable instructions that when executed perform a method, comprising: receiving an image comprising a portion of a subject from a photograph or other two-dimensional depiction of the subject; cartoonizing the image to create a cartoonized output; receiving a selection of an animated story from a database of predefined animated stories; incorporating the cartoonized output into the animated story; and outputting an animated video comprising the cartoonized output incorporated into the animated story. The computer-readable medium may further include the database of predefined animated stories.

BRIEF DESCRIPTION OF THE FIGURES

Exemplary embodiments are illustrated in referenced figures of the drawings. It is intended that the embodiments and figures disclosed herein are to be considered illustrative rather than restrictive.

FIG. 2 depicts a flow chart illustrating a method for creating an animated video with cartoonized elements in accordance with an embodiment of the present invention.

DETAILED DESCRIPTION OF THE INVENTION

Figure 1:
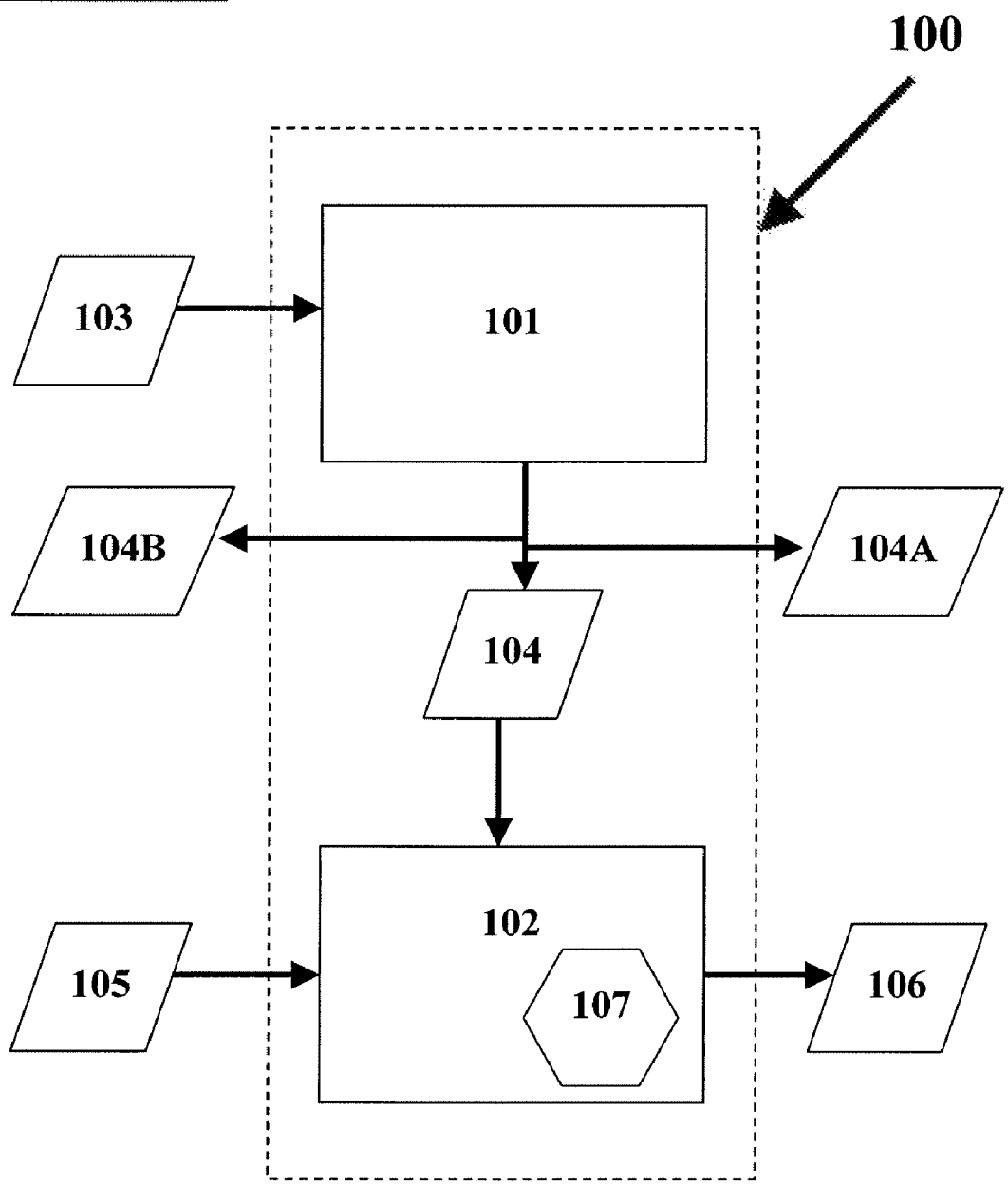
FIG. 1 depicts a system for creating an animated video with cartoonized elements in accordance with an embodiment of the present invention.

Unless defined otherwise, technical and scientific terms used herein have the same meaning as commonly understood by one of ordinary skill in the art to which this invention belongs. One skilled in the art will recognize many methods and materials similar or equivalent to those described herein, which could be used in the practice of the present invention. Indeed, the present invention is in no way limited to the methods and materials described.

The invention is based on a unique application of animation technology, primarily, although not exclusively, for entertainment purposes. In one embodiment, an animated story or cartoon is created in which a cartoonized version of a subject is prepared, and is thereafter incorporated into a predefined animated story.

As used herein, the term "cartoonize" refers to a computer process resulting in the manipulation of a subject's image from a photograph (digital or otherwise) or other 2D depiction of the subject that creates a cartoon version of at least a portion of the subject. The cartoon version of the subject (or portion thereof) may be based on a library of 2D representations of the subject. The library includes a series of views of the subject taken from 1 to m different viewpoints and/or with 1 to n variations in the substance of the subject. The creation of this library can be accomplished by any number of modeling or animation schemes that distort an image based on a particular mathematical pattern. By way of non-limiting example, a digital photograph of a person can be "cartoonized" by creating a library of 2D representations of the person's face (which may be only a portion of the subject, depending upon the particulars of the photograph). The library may include a series of views of the person's face from 1 to m different viewpoints (e.g., face looking forward, turned 1 degree to the left, turned 2 degrees to the left, turned upwards, turned downwards, etc.), and/or a series of 1 to n facial expressions (e.g., smiling, frowning, sleeping, etc.) or computerized distortions. A number of software products are available to cartoonize a single photograph or other 2D depiction of a subject in this manner, such as, by way of example, Adobe Photoshop® software (available from Adobe Systems, Inc.; San Jose, Calif.) using filters such as "posterizing," "fading gauss blurs," and any number of other filters and graphics tools, CorelDRAW® graphics software (available from Corel Corporation; Ottawa, Canada), Comic Life software (available in multiple versions from Apple Computer, Inc.; Cupertino, Calif.), Microsoft Paint (available from Microsoft Corporation; Redmond, Wash.), Microsoft Acrylic (codename for a beta version of a product available from Microsoft), and the like. Thus, the aforementioned cartoonizing process can be readily implemented by one of skill in the art without undue experimentation, using any number or combination of commercially available products.

In one embodiment of the present invention, as illustrated in FIG. 1, a system 100, which may be embodied in a software application, is provided for creating an animated video with cartoonized elements. The software application may be a single application or a suite of several standalone applications that are configured to communicate with one another. The software application(s) may be configured to operate on a computer or similar electronic device and/or may operate through a user interface with a network connection, such as over the Internet.

The system 100 may include a cartoonizing application 101 with an input 103 and an output 104. The cartoonizing application 101 may be a commercially available product, a combination of commercially available products, a modified version thereof, or any other application that is configured to perform the cartoonizing process described herein. By way of example, some commercially available products that may be used as cartoonizing applications in connection with various embodiments of the present invention include, but are in no way limited to, Adobe Photoshop® software, CorelDRAW® graphics software, Comic Life software, Microsoft Paint™, Microsoft Acrylic™, and many others that will be readily appreciated by those of skill in the art, as well as combinations or variants of the aforementioned products.

The system 100 may further include an animation application 102 with an input 105 and an output 106. The animation application may be a commercially available product, a combination of commercially available products, a modified version thereof, or any other application that is configured to perform the animation process described herein. By way of example, some commercially available products that may be used as animation applications in connection with various embodiments of the present invention include, but are in no way limited to, Mirage™ software (available from Bauhaus Software, Inc.; San Antonio, Tex.) Maya® animation software (available from Alias Systems Corp.; Toronto, Canada), Harmony™ and Opus™ 2D animation software packages, KToon™ 2D animation toolkit, and Flash MX™ 2004 and Animo™ software package (available from Cambridge Animation Systems; Cambridge, England).

One of skill in the art will readily recognize other products and applications that may be used to achieve the functionality of the cartoonizing application 101 and animation application 102 of the present invention. Such products and applications are considered to be within the scope thereof.

In one embodiment, the input 103 to the cartoonizing application 101 includes a photograph or other 2D depiction of a subject. The cartoonizing application 101 may be configured to accept any number of electronic file formats for the photograph or other 2D depiction of the subject (e.g., .jpg, .png, .gif, .bmp, .pdf, etc.).

In another embodiment of the present invention, the cartoonizing application 101 provides an array of graphics editing options to a system user; enabling the user to modify the 2D depiction of the subject. Any number of graphics editing options can be incorporated in the cartoonizing application 101, as will be readily appreciated by those of skill in the art. The cartoonizing application 101 may include a user selection operation whereby a system user selects a portion of the photograph or other 2D depiction of a subject to be cartoonized (e.g., if the subject is a person and the photograph depicts a full body image of the person, a portion selected for cartoonizing may be the person's face). Additionally, the user may have the option of adjusting the size of the 2D depiction of the subject or portion thereof (e.g., smaller, thinner, wider, etc.), as well as the options of adjusting skin tones, selecting eye color, and the like. A practically unlimited number of such graphics editing options may be included in the cartoonizing application 101 in connection with alternate embodiments of the invention. The graphics editing options may be implemented by a system user by selecting values with radio buttons, selection dialogs, and the like.

Moreover, the cartoonizing application 101 may be configured such that a system user implements a graphics editing operation (e.g., a change in eye color), and the results of that editing operation are displayed as a preview via output 104. The output 104 of the cartoonizing application 101 is a cartoonized version of the photograph or other 2D depiction of the subject or portion thereof. The output 104 of the cartoonizing application 101 may be in electronic communication with the animation application 102. In an alternate embodiment of the present invention, the output 104 may additionally or alternatively include a print feature that enables a system user to create a printed version 104A of the cartoonized version of the photograph or other 2D depiction of the subject or portion thereof. Any printing device in electronic communication with the cartoonizing application 101 may be used in connection with this aspect of the invention, as will be readily appreciated by those of skill in the art. In a still further alternate embodiment of the present invention, the output 104 may additionally or alternatively include a view feature 104B that enables a system user to view the cartoonized version of the photograph or other 2D depiction of the subject or portion thereof. Any viewing device may be used in connection with this aspect of the invention, as will be readily appreciated by those of skill in the art; for instance, a computer monitor or other display apparatus in electronic communication with the cartoonizing application 101.

The animation application 102 may include a database of predefined animated stories 107. In operation, the animation application 102 incorporates the cartoonized version of the subject or portion thereof from the photograph or other 2D depiction into predetermined locations in the one or more predefined animated stories from the database 107 to create an animated video with cartoonized elements. Although this can be readily accomplished in a number of ways, in one embodiment of the present invention, each predefined animated story includes a template with positions marked throughout for character faces or other components of the animation. Specifically, a predefined animated story may be comprised of a series of frames (1-n) each with a standard set of Cartesian coordinates. Thus, a template may indicate that, at a particular frame, and a specified set of coordinates and geometric shape values (radiis, diameters, etc.), the cartoonized version of the image is positioned. The template may provide for a wide array of additional features to further modify or select a particular cartoonized version, such as an indication of a particular facial position type (e.g., viewed from the left or right side), a palette for skin tone values, and many others.

By way of non-limiting example, in one embodiment of the present invention, the predefined animated stories are a series of different children's tales including the same or different characters (e.g., superheroes, animals, fairy tale characters, etc.), and the cartoonized version of the subject or portion thereof is the face of a person from a photograph. In this embodiment, the person's cartoonized face becomes the face of one or more of the characters in the story. Rather than being used in a single frame, the cartoonized face is used throughout the story for that character (or characters), with various viewpoints, expressions, and the like, as is necessitated by the particular story and the animation scheme that illustrates it.

In an alternate embodiment, multiple faces can be input to the system 100 such that, for example, the face of each member of a family in a photograph may be cartoonized and thereafter become the face of a different character in a story. In a still further alternate embodiment, additional aspects of the subject may be included from the photograph or other 2D depiction, such as the user's body, such that the characters in the stories take on these features of the subject as well (e.g., body type, height, hairdo, etc.).

The input 105 may further include a series of user selection operations whereby a system user selects a particular predefined animated story from the database 107. In alternate embodiments of the present invention, the series of user selection operations may also include a user selection of other character parameters for the story that relate to the predefined animation and not to the manipulation of the 2D image (e.g., height, weight, name, etc. of each character). The input 105 may also allow the user to select the format of output 106 that is desired (e.g., selection of storage media for the finished product, selection of print parameters and format for printing some or all of the animated video).

The animated video with cartoonized elements may be output from the system 100 through the animation application output 106. The system 100 may be configured to store the animated video with cartoonized elements directly onto a digital versatile disc (DVD) or hard disk drive (HDD) or another conventional electronic storage medium. The system 100 may also be configured to output the animated video through an electronic communications channel, such as via upload to the Internet or as an attachment to an electronic mail message. The output 106 may alternatively or additionally be configured for any number of output formats (e.g., pal/ntsc, 35 mm, Flash, etc.). In an alternate embodiment of the present invention, the output 106 may additionally or alternatively include a print feature that enables a system user to create a printed version 106A of some or all of the animated video with cartoonized elements. Any printing device in electronic communication with the animation application 102 may be used in connection with this aspect of the invention, as will be readily appreciated by those of skill in the art. A system user may, for instance, print some or all of the frames of a particular animated video. In one embodiment, the output 106 may be formatted for printing some or all of the frames of a particular animated video in a comic book type format.

As illustrated in FIG. 2, in another embodiment of the present invention, a method for preparing an animated video with cartoonized elements is provided. In one embodiment, a photograph or other 2D depiction of a subject is provided 201. A user may then, optionally, select a portion of the subject for cartoonizing 202. The image or portion thereof may then be cartoonized 203. The user may then, optionally, select a predetermined animated story into which to incorporate the cartoonized image 204. The user may, optionally, select additional features for the animated video that will ultimately be created 205, such as parameters of the characters in the story, output format, etc. The subject or portion thereof is then incorporated into predetermined locations in the animated story. The animated video and/or a printed version, in whole or in part, thereof with cartoonized elements is thereafter output 206.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein

What is claimed is:

1. A system for cartoonizing an image and incorporating cartoonized representations of said image into an animated video, the image including at least a person's face, the system comprising:

a computer-readable medium;

a cartoonizing application to cartoonize said image, said cartoonizing application comprising a library of cartoonized representations of said person's face, said cartoonized representations of said person's face comprising a series of different facial expressions or computerized distortions of said person's face, said cartoonizing application further including one or more graphics editing options for altering characteristics of said person's face; and an animation application to incorporate said cartoonized representations into corresponding templates found in an animated video based on an animated story selected from a database of predefined animated stories, said animation application incorporating said cartoonized representations into said animated video as a designated character of said animated story, said cartoonized representations being incorporated throughout and from beginning to end of said animated story for said designated character, said animation application further including one or more user selection operations for altering character parameters for said animated story that are related to said animation video and not related to manipulation of said image, wherein said cartoonizing application and said animation application are each stored on said computer-readable medium, and said animation application further comprises said database of predefined animated stories; and wherein the corresponding templates found in the animated video based on an animated story selected from each predefined animated story in said database of predefined animated stories further comprises positions assigned on each template for the animation application to insert said cartoonized representations on said template in which said cartoonized representations are predetermined to appear, the positions being defined by at least a set of coordinates and geometric shape values.

2. The system of claim 1, wherein said image is obtained from a photograph or other two-dimensional depiction of a subject.

3. The system of claim 2, wherein said cartoonizing application includes at least one graphics editing option selected from the group consisting of an option to select a portion of said image, said image being a photograph or other two-dimensional depiction of a subject to be cartoonized, an option to adjust the size of the image, an option to change the skin tone or eye color of said person and combinations thereof.

4. The system of claim 3, wherein said at least one graphics editing option comprises an option to adjust the size of said image to cause the subject to appear smaller or thinner or wider.

5. The system of claim 1, wherein said system is configured to display said cartoonized representations as a preview prior to said animation application incorporating said cartoonized representations into said animated video.

6. The system of claim 1, wherein each template is assigned at least one feature to further modify or select a particular cartoonized representation from said library of cartoonized representations.

7. The system of claim 6, wherein said at least one cartoonized representation is selected from the group consisting of facial position type, palette of skin tone, facial viewpoint, and combinations thereof.

8. The system of claim 1, wherein said animation application is configured to receive at least one user input selected from the group consisting of a selection of a predefined animated story from said database of predefined animated stories, a selection of a character parameter, a selection of a format of a system output, and combinations thereof.

9. The system of claim 1, wherein said system is configured to produce a system output comprising an animated video.

10. The system of claim 9, wherein said system is configured to store said system output on an electronic medium, or to transmit said system output through an electronic communications network, or both.

11. The system of claim 1, wherein said system is configured to produce a system output comprising a printed version of some or all of said animated video.

12. The system of claim 1, wherein said cartoonizing application is configured to cartoonize an image for each of a number of subjects and create cartoonized representations for each such cartoonized image, and wherein said animation application is configured to incorporate each of said cartoonized representations into said animated video based on said animated story selected from said database of predefined animated stories.

13. The system of claim 12, wherein each predefined animated story in said database of predefined animated stories further comprises a series of templates with positions assigned on each template for insertion of one or more of said cartoonized representations on those of said templates in which one or more of said cartoonized representations is predetermined to appear.

14. A method for cartoonizing an image and incorporating cartoonized representations of said image to an animated video, comprising:
  providing a system comprising:
    a cartoonizing application,
    an animation application, and
    a database of predefined animated stories;
  providing a photograph or other two-dimensional depiction of a subject;
  selecting a portion of said subject from said photograph or other two-dimensional depiction of said subject;
  creating a series of cartoonized representations of said subject's face, said cartoonized representations comprising a series of different facial expressions or computerized distortions of said subject's face;
  providing one or more graphics editing options for altering characteristics of said subject's face;
  selecting an animated story from said database of predefined animated stories containing at least one corresponding template;
  incorporating said cartoonized representations into said at least one corresponding template found in said animated story, the cartoonized representations being incorporated as a designated character of said animated story and being incorporated throughout and from beginning to end of said animated story for said designated character, wherein the at least one corresponding template comprises positions assigned on each template for the animation application to incorporate said cartoonized representations on said template in which said cartoonized representations are predetermined to appear, the positions being defined by at least a set of coordinates and geometric shape values;
  providing one or more user selection operations for altering character parameters for said animated story that are related to said animation video and not related to manipulation of said photograph or said two-dimensional depiction of said subject; and
  outputting said animated video comprising said cartoonized representations incorporated into said animated story.

15. The method of claim 14, further comprising selecting a particular cartoonized representation from said series of cartoonized representations or modifying a feature assigned to said at least one template.

16. The method of claim 14, further comprising displaying at least one of said cartoonized representations as a preview prior to said incorporating said cartoonized representations into said animated story.

17. The method of claim 14, wherein said outputting of said animated video further comprises outputting said animated video in a format selected from the group consisting of a video format, a print format, and combinations thereof.

* * * * *